Feb. 19, 1963   A. W. STANLEY   3,077,805
TRIMMING BOARDS
Filed Jan. 13, 1961   2 Sheets-Sheet 1
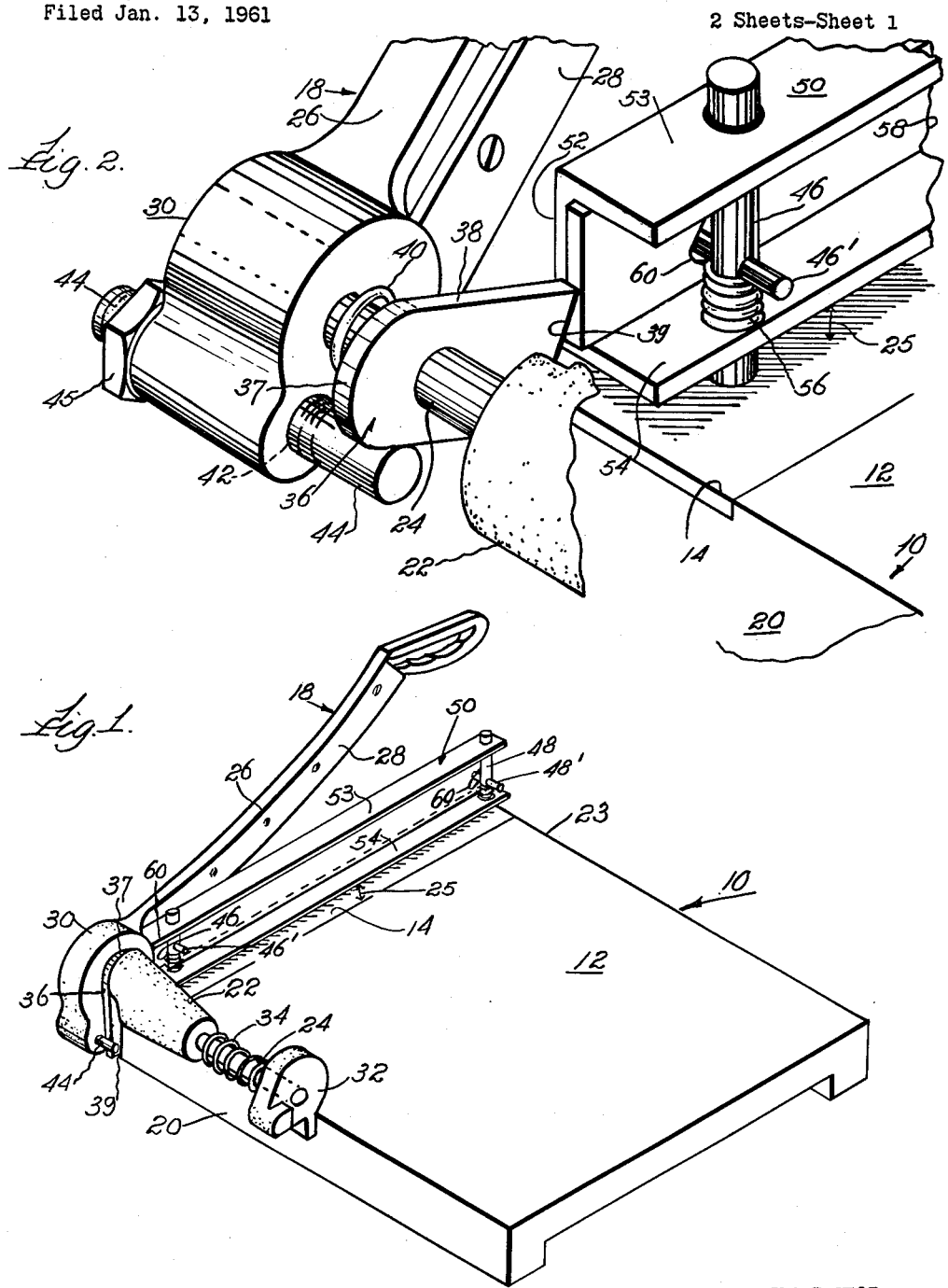
INVENTOR.
Alfred W. Stanley.
BY
Attorney.

Feb. 19, 1963  A. W. STANLEY  3,077,805
TRIMMING BOARDS
Filed Jan. 13, 1961  2 Sheets-Sheet 2
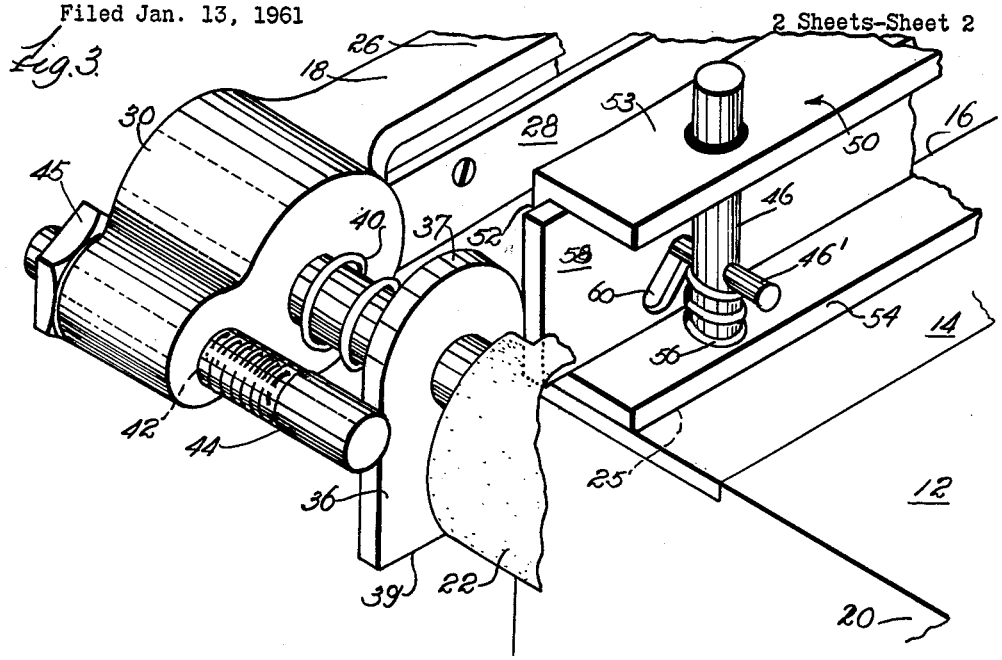
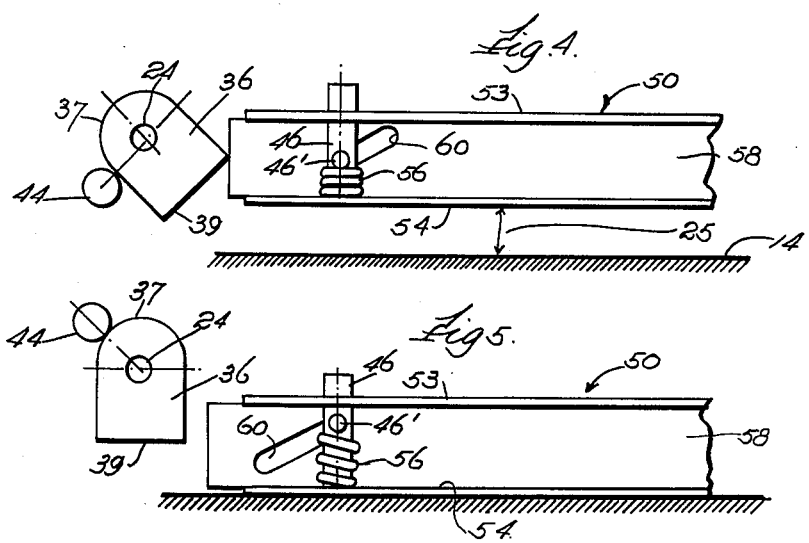
INVENTOR.
Alfred W. Stanley
BY Max R. Kraus
Attorney.

United States Patent Office 3,077,805
Patented Feb. 19, 1963

3,077,805
TRIMMING BOARDS
Alfred W. Stanley, Chicago, Ill., assignor to Photo Materials Co., Chicago, Ill., a corporation of Illinois
Filed Jan. 13, 1961, Ser. No. 82,441
2 Claims. (Cl. 83—384)

This invention relates to trimming boards, and more particularly to the means for clamping the objects to be trimmed.

One of the objects of this invention is to provide a trimming board with means for automatically clamping the object to be trimmed during the trimming operation.

Another object of this invention is to provide a trimming board with clamping means which upon the initial downstroke movement of the cutting knife and before the trimming takes place will automatically clamp the object to be trimmed and will maintain same in clamped position during the trimming operation, and that upon positioning of the cutting knife to its normal elevated position the clamping means will be positioned in non-clamping position.

Another object of this invention is to provide clamping means of the foregoing objects in which the clamping member moves vertically parallel to the trimming board in its movement from non-clamping to clamping position and vice versa, wherefore the clamping takes place simultaneously along the entire area of the clamping surface. This prevents any dislodgement or shifting of the material to be trimmed during the trimming operation.

Another object of this invention is to provide clamping means of the foregoing character which can be adapted to conventional trimming boards.

Another object of this invention is to provide a trimming board with clamping means which may be economically produced and which is highly efficient in operation.

Other objects will become apparent as this description progresses.

In the drawings:

FIGURE 1 is a perspective view of a trimming board showing this invention.

FIGURE 2 is an enlarged fragmentary perspective view with the parts in non-clamping position.

FIGURE 3 is a view similar to FIGURE 2, with the parts in clamping position.

FIGURE 4 is a view illustrating the parts in non-clamping position, and

FIGURE 5 is a view similar to FIGURE 4, with the parts in clamping position.

The trimming board 10 comprises a base member or board 12, made preferably of wood and suitably scored. The board is recessed along one side to accommodate a metal strip or bed blade 14 provided with a cutting edge 16 and adapted to cooperate with a cutting element generally indicated at 18, to produce a shearing action. The bed plate 14 is secured to the board by suitable fastening elements. A ruler, not shown, is secured to the board along the top edge of the board.

Suitably secured to the top side 20 of the board is a conventional bearing 22. The bearing 22 supports a bearing stud 24, to the outer end of which is fixedly secured the cutting element 18 which consists of a handle 26 on which is mounted a cutting blade 28. The handle 26 has an enlarged portion 30 which has a transverse opening to receive the bearing stud 24 and to which it is fixedly secured. The opposite end of the bearing stud 24 is supported in an end member 32 which is suitably secured to the top side 20 of the board. Mounted on the bearing stud 24, between the end member 32 and the outer wall of the bearing 22 is a coil spring 34.

Mounted on the bearing stud 24 and freely revolvable on and rotatable with respect to the bearing stud 24 is an actuator 36, best shown in FIGURES 2 and 3, which is curved at the top as at 37 and has opposite straight sides 38 and a straight bottom 39 at right angles to the sides. A coil spring 40 is positioned on the bearing stud 24 with one end against the side of the enlarged portion 30 of the handle 26 and the other against the actuator 36 to position the actuator adjacent the outer wall of the bearing 22.

The enlarged portion 30 of the handle 26 has an internally threaded bore 42 to receive a pin 44 which is threaded for a portion of its length. The pin 44 extends laterally for engagement with the actuator member 36 as the handle 26 is pivoted. An adjustment nut 45 is provided for adjustment of the pin 44.

Secured to the board 12 adjacent the shearing edge are two stationary vertical guide pins 46 and 48. The pin 46 is secured near the top side 20 of the board, while the pin 48 is secured near the bottom side 23, so as to leave a large uninterrupted clamping area 25 therebetween.

An elongated clamping bar generally designated at 50 is vertically slideable or movable with respect to guide pins 46 and 48. The clamping bar 50 is channel shaped and has a vertical wall 52 and upper and lower flanges 53 and 54 at right angles thereto. The flanges 53 and 54 are provided with a pair of alined openings to accommodate the vertical guide pins 46 and 48. Each of the guide pins supports a transverse pin 46' and 48' respectively, and a coil spring 56 is positioned on each of the guide pins between the transverse pin and the lower flange 54 of the clamping bar 50 to normally urge the clamping bar 50 downwardly toward the board 14 when the clamping bar is released for such movement.

Slideable horizontally within the clamping bar 50 is an elongated slide bar 58 which is actuated by the actuator 36, as will be described. The slide bar 58 has a pair of spaced parallel inclined slots 60 and 61 approximately at a 45° angle. The two inclined slots are engaged respectively by the front and rear transverse pins 46' and 48' on the front and rear guide pins respectively. The slots and transverse engaging pins limit the sliding movement of the slide bar 58 within the clamping bar 50, and it is the sliding movement of the slide bar 58 that raises or lowers the clamping bar 50.

In normal non-cutting position the cutting element 18 is elevated as shown in FIGURE 2. In this position the pin 44 on the handle 26 of the cutting element 18 has previously moved to engage the actuator 36 and has rotated the actuator clockwise, as viewed in the drawings, to the position shown in FIGURE 2, where it has engaged the slide bar 58 to move the slide bar forwardly or to the right, as viewed in the drawings. Movement of the slide bar forwardly will cause the slide bar 58 to ride up or elevate by virtue of the inclined slots 60—61 in engagement with the transverse pins 46'—48'.

As the slide bar 58 moves up on the transverse pins, as shown in FIGURES 2 and 4, it moves the clamping bar 50 upwardly, at all times parallel with the board 14. Raising of the clamping bar 50 provides the spacing between it and the board for insertion of the material to be cut. As the clamping bar is raised, the coil springs 56 on the guide pins are compressed and they remain compressed as long as the actuator 36 is urging the slide bar forwardly.

With the cutting element 18 elevated, the material to be cut is positioned on the board and in the open clamping space, with the parts as shown in FIGURES 2 and 4. As the cutting element is manually pivoted to a lowered position, the pin 44 will move out of engagement with the actuator 36 so that the actuator is free for rotation or movement in the direction opposite to which it was previously moved, namely, counterclockwise, as viewed in the drawings. Since the actuator 36 is no longer exerting any forward pressure on the slide bar 58, the coil springs 56 on the guide pins 46 and 48 will then be free to expand to urge the clamping bar 50 downwardly, and as this occurs the slide bar 58 will move down with it in a rearward direction or to the left, as viewed in the drawings, with the inclined slots 60 and 61 riding down on the transverse pins 46' and 48', respectively, to position the clamping bar 50 to clamping position, as shown in FIGURES 3 and 5. As the slide bar 58 moves rearwardly it rotates the actuator 36 back to its initial position, as shown in FIGURES 3 and 5.

The springs 56 move the clamping bar 50 in clamping position and hold it in clamping position before the blade 28 on the cutting member engages any part of the paper or material to be cut. As the handle 26 is moved to shear the material, the pin 44 on the handle does not engage the actuator 36, consequently it does not operate the actuator. It remains as in FIGURES 3 and 5. The springs 56 are the sole force that maintains the clamping bar in clamping position. As the cutting element 18 is pivotally raised, the pin 44 on the handle will engage the actuator 36 to rotate the actuator counterclockwise, as viewed in FIGURES 2 and 4, to push the slide bar forwardly and to raise the clamping bar, as previously described. The clamping bar 50 always moves parallel to the board in moving to either clamping or non-clamping position.

It will be understood that various changes and modifications may be made from the foregoing without departing from the spirit and scope of the appended claims.

What is claimed is:

1. A trimming board having a cutting edge along one upper edge thereof, an oscillating cutting knife pivotally mounted at one end on said trimming board to swing to an inoperative position above said upper edge and adapted to cooperate with said cutting edge to produce a shearing action, a plurality of uprights supported on the upper side of said board adjacent said one upper edge thereof, a clamping member mounted on and vertically movable with respect to said uprights, a second member supported by said clamping member and having inclined slots therein, means on said clamping member to retain said second member against all movement relative thereto except that of relative longitudinal movement, a slot engaging member fixedly mounted on each said upright, spring means on said uprights engaging said clamping member, means movable with said cutting knife to engage said second member to move said second member longitudinally in one direction to elevate said clamping member to non-clamping position and compress said springs when said cutting knife is in its pivoted up position, said last mentioned means adapted when said cutting knife is pivoted to cutting position to disengage from said second member so that said springs act against said clamping member to cause said second member to slide longitudinally on said slot engaging members in the opposite direction to said one direction to move the clamping member downwardly into clamping position.

2. In a structure defined in claim 1 in which the clamping member comprises an elongated substantially channel-shaped bar wtih the second member nesting within said bar and slidable therein.

References Cited in the file of this patent

UNITED STATES PATENTS 333,783    Robinson    Jan. 5, 1886

FOREIGN PATENTS 473,870    Germany    Mar. 22, 1929
696,641    Great Britain    Sept. 2, 1953